United States Patent

Fischer

[15] 3,678,883

[45] July 25, 1972

[54] WORN BEARING INDICATOR

[72] Inventor: John F. Fischer, Los Alamitos, Calif.

[73] Assignee: Smith International Incorporated, Newport Beach, Calif.

[22] Filed: March 25, 1970

[21] Appl. No.: 22,609

[52] U.S. Cl. .......................................... 116/114 Q, 175/39
[51] Int. Cl. .................................................. G01d 21/00
[58] Field of Search .................. 116/114, 114 Q; 175/39, 40, 175/42; 73/151.5; 308/239

[56] References Cited

UNITED STATES PATENTS

| | | | |
|---|---|---|---|
| 2,468,905 | 5/1949 | Warren, Jr. | 175/42 |
| 2,582,312 | 1/1952 | Del'Homme | 175/39 |
| 2,657,909 | 11/1953 | Bielstein | 175/39 |
| 2,658,724 | 11/1953 | Arps | 175/39 |
| 3,011,566 | 12/1961 | Graham | 175/39 |
| 3,363,702 | 1/1968 | Bielstein | 175/39 |

*Primary Examiner*—Louis J. Capozi
*Attorney*—Christie, Parker & Hale

[57] ABSTRACT

An earthboring drill or the like having cutters mounted on bearings including a plurality of bearing segments is described. An insert is provided within at least a portion of the segments with a clearance from the original bearing surface of an amount just equal to acceptable wear of the segment, so that when the segment wears down the insert has substantial contact with adjacent bearing surfaces to provide a remotely sensible signal indicative of bearing wear. In one embodiment, the insert is formed of tungsten carbide or other similar hard material that causes the bearing to jam or lock, thereby increasing torque on the drill bit, which is sensed by the driller. In another embodiment, a mobile marker, such as a liquid radioactive material or dye, enclosed in a frangible container employed as the insert, and the release of dye or radioactive material when the insert contacts a bearing wall provides an indication of bearing wear.

20 Claims, 6 Drawing Figures

Patented July 25, 1972

3,678,883

INVENTOR.
JOHN F. FISCHER
BY
Christie, Parker & Hale
ATTORNEYS

WORN BEARING INDICATOR

BACKGROUND

Movable ball or roller bearings are commonly used in place of sleeve bearings and the like because of the reduced friction contact between the bearing and the journal or race. Sleeve bearings do not provide for balanced clearance spaces at all points around the bearing, and they do not index or precess with rotation of the rotary member or members. Consequently excessive wear occurs at the point of greatest pressure. In the case of ball or roller bearings, there is individual rotation between the relatively rotatable parts whose friction they are intended to reduce so that the continual precession more uniformly spreads wear.

It has been found that where the relatively rotatable parts are subject to heavy loads, ball bearings and roller bearings have such small points or lines of contact with relatively rotatable parts that one or both of the parts is soon subject to spalling. For example, in the use of rock bits for deep well drilling, such as for oil or gas wells or the like, the bit may comprise three journals, each having a conical rotary cutter thereon. The bit as a unit may be subject to pressures as high as, for example, 75,000 pounds, so that the journal of each of the three sets of journals and cutters is subject to about 25,000 pounds pressure. Since the loads are nearly continuously directed onto the cutting face of the bit, the undersides of the journals will, in a relatively short time, become badly spalled and the bit must be replaced.

In recent years, segment bearings have been employed in lieu of ball or roller bearings since they provide the advantage of a substantial area of contact between the relatively rotatable parts, such as the rock cutter and the journal. This reduces the unit pressure on the journal and alleviates the problem of spalling. In addition, the segments of the bearing index or precess as the bearing is used, so that the wear is distributed on the several segments for prolonged bearing life.

Although the segment bearings are superior to ball and roller bearings in many situations, a problem associated with wear of the bearing segments is sometimes still encountered in rock drills and the like. In a ball or roller bearing, when the bearing has worn or spalled to the point that it is no longer operating satisfactorily, the bearing elements become jammed together so that the usually relatively rotatable parts are locked or "frozen" and no longer freely rotate. In a rock drill, when a cutter freezes in this manner due to the bearing jamming, there is a substantial increase in torque in the drill string, which can be detected by an experienced driller, enabling him to stop the drilling operation and withdraw the string for replacing the bit.

In a segment bearing, on the other hand, the bearing continues to permit relative rotation of the parts, even after an unacceptable wear has occurred. In this situation, it is possible that the cutter will come off the journal in the drill hole without providing any signal to the driller that the bearing is worn. When this occurs, it becomes necessary to withdraw the drill string and "fish" in the hole to retrieve the cutter before drilling operations can continue. This operation is time-consuming and expensive and is subject to serious operational difficulties. It is, therefore, highly desirable to provide a means for indicating at a remote location, such as the ground surface, a selected degree of wear of a segment bearing, such as, for example, in a rock drill.

BRIEF SUMMARY OF THE INVENTION

There is provided in practice of this invention a bearing segment having an insert therein for providing a remotely sensible signal indicative of a selected degree of bearing wear, and a sufficient clearance between a portion of the insert and the bearing surface of the segment to prevent substantial contact of the insert and an adjacent part when the segment is in satisfactory condition. In one embodiment, the insert comprises a cylinder of hard material for causing jamming of the bearing in a rock drill when, as a result of bearing wear, the insert is in substantial contact with an adjacent bearing surface. In another embodiment, the insert comprises a frangible container having a mobile marker material, such as a liquid dye or radioactive material, contained therein.

DRAWINGS

The features and advantages of the present invention will be more fully understood by reference to the following detailed description when considered in connection with the accompanying drawings wherein.

Throughout the drawings like numerals refer to like parts.

DESCRIPTION

Figure 1:
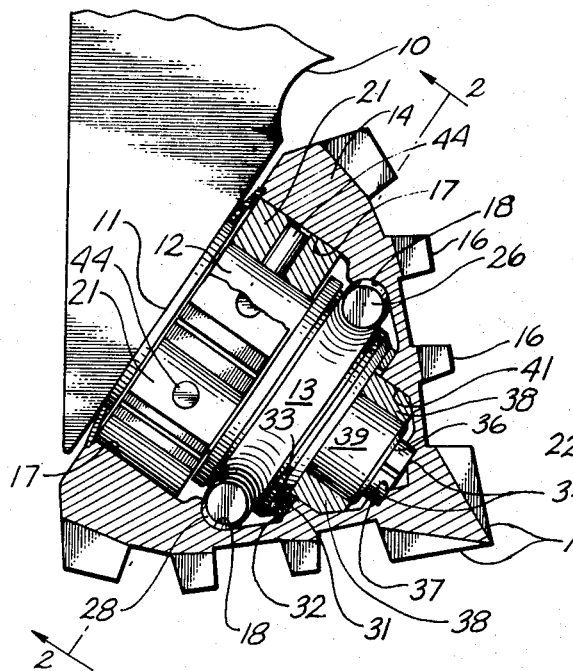
FIG. 1 illustrates in side cross section a portion of rock drill having a segment bearing incorporating principles of this invention.
Figure 2:
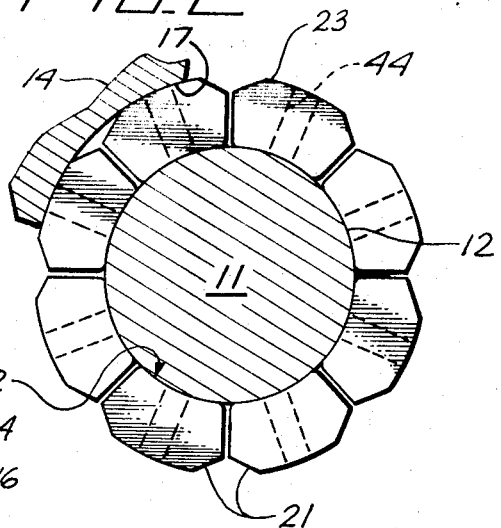
FIG. 2 illustrates a cross section taken along line 2—2 of the bearing of FIG. 1.
Figure 3:
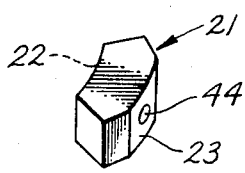
FIG. 3 illustrates in perspective one of the bearing segments of FIG. 2.

FIG. 1 illustrates in side cross section a small portion of a rock bit incorporating principles of this invention. Such a rock bit is conventionally employed on the end of a drill string or pipe which is rotated at the surface for rotating the drill bit deep in a bore hole. As illustrated in this embodiment, the drill bit includes a conventional drill bit body 10, which conventionally includes means for connecting the drill bit to a drill string, passages for drilling fluid, and means for lubricating bearings (none of which are shown since they form no part of this invention). The drill bit body 10 includes a diagonally extending journal 11, including a cylindrical bearing surface 12. Downwardly and outwardly from the bearing surface 12 is a second bearing surface 13 in the form of a peripheral groove having the shape of a portion of a torus. In some prior arrangements of drilling bit, the cylindrical bearing surface 12 would accommodate roller bearings and the annular bearing surface 13 on the journal would accommodate ball bearings.

Mounted on the journal 11 for rotation thereon is a conventional drill bit cutter 14 having hardened projecting teeth 16 for cutting through rock as the drill bit is used. An inner cylindrical race 17 on the cutter is concentric with the cylindrical bearing surface 12 on the journal. Similarly, an inner annular groove 18 on the cutter is concentric with the toroidal bearing surface 13. Collectively the annular groove 18, forming a bearing race on the cutter, and the inner bearing surface 13 on the journal define a torus.

Mounted between the cylindrical bearing surface 12 on the journal and the cylindrical race 17 are a plurality of arcuate segments 21, each having an inner arcuate face 22 mating with the journal bearing surface 12, and an outer arcuate face 23 mating with the inner cylindrical surface 17 on the cutter. Each of the segments 21 extends only a fraction of the distance around the assembled bearing, and, as is well known, because of the relative proportions of the inner and outer arcuate faces 22 and 23, respectively, the segments precess about both the journal and the race as the bearing is operated.

Figure 4:
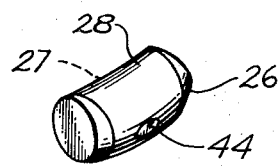
FIG. 4 illustrates in perspective another embodiment of a bearing segment in the bearing of FIG. 1.

Similarly, there are a plurality of segments 26 in the form of fractions of the circumference of a torus in the toroidal space defined by the bearing surface 13 on the journal and the outer race 18 on the cutter. As illustrated in FIG. 4, each of these toroidal segments 26 has an inner bearing face 27 for engaging the bearing surface 13 on the journal, and an outer bearing face 28 for engagement with the outer race 18 on the cutter.

Another form of segment 31 having parallel bearing faces is provided between a flat thrust bearing surface 32 on the journal and a corresponding flat thrust bearing surface 33 within the cutter. Each of these segments 31 is of an arcuate shape (not illustrated) in a plane parallel to its bearing faces for fitting around the circular flat bearing surface 32. An additional plurality of thrust bearing segments 34 have flat parallel bearing faces between the flat end 36 of the journal and a corresponding flat face 37 within the cavity in the cutter. Each of these thrust bearing segments 34 is in the shape of a segment of a circle (not illustrated) when viewed in a plane parallel to their bearing faces. The thrust bearing segments 31 and 34 also precess and operate in substantially the same manner as the hereinabove described arcuate segments 21. An additional plurality of arcuate segments 38 are also provided between a cylindrical bearing surface 39 on the journal and a bearing race 41 on the cutter, these arcuate segments 38 being substantially the same as those arcuate segments 21 hereinabove described.

Figure 5:
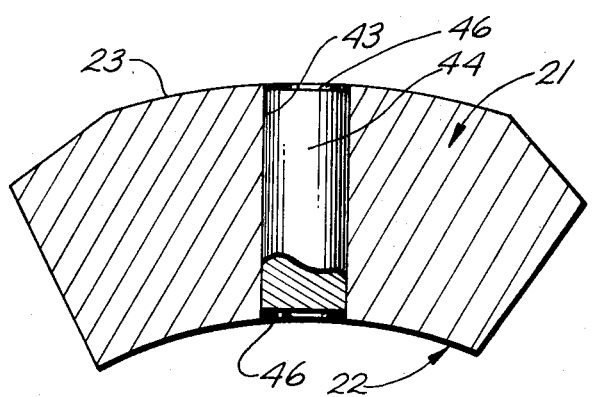
FIG. 5 illustrates in cross section a bearing segment including an insert.

FIG. 5 illustrates in cross section one of the arcuate segments 21 incorporating principles of this invention which is representative of other of the segments 26, 31, 34, and 38. The segment 21 is conveniently made of aluminum bronze or other similar bearing material somewhat softer than the material of the journal or cutter so that wear occurs preferentially on the segment. A transverse hole 43 is formed between the opposite bearing faces 22 and 23, and a signal producing insert 44 is slidably or loosely fitted within the hole. In the illustrated embodiment of FIG. 5, the insert 44 is preferably a cylinder of tungsten carbide or other similar very hard material. If desired, either a portion or all of the segments may be provided with wear indicating inserts.

A clearance 46 is provided at the ends of the cylindrical insert 44 such that the length of the insert is less than the distance between the bearing faces 22 and 23 by an amount sufficient to prevent substantial contact of the insert and both the adjacent journal and race when the segment is installed in the bearing. Since the insert is preferably loose in the hole, intermittent insubstantial contact between the insert and bearing surfaces may occur during normal operation of the bearing. The clearance 46 is sufficiently short that when the bearing segment 21 is worn to an unacceptable extent, the end of the insert firmly contacts the journal and cutter bearing surface for indicating wear. In other words, the extent of the clearance is equal to a preselected acceptable degree of wear of the segment. In a typical embodiment involving a rock drill, a substantial amount of wear of the segments can be accommodated during operation, and the clearance 46 may be as much as 0.015 inch total. The segment may therefore wear as much as 0.015 inch before any substantial contact is made between the insert and the adjacent bearing surfaces.

When a segment 21, or other of the segments, wears to the point that the hard insert 44 comes in firm contact with both of the bearing surfaces 12 and 13 on the relatively rotatable journal and cutter, respectively, the carbide insert jams and locks the otherwise relatively rotatable parts so that the cutter is stopped. In addition to jamming the bearing by contact of the insert with the bearing surfaces, the load of the hardened insert against the bearing surfaces will often cause the segment to be broken in two, and these fragments also tend to jam in the space between the journal and race for locking the bearing against relative rotation. In a rock drill when one of the cutters stops rotating, there is a noticeable increase in torque in the drill string at ground level. The driller sensing this increase in torque, stops the drilling operation and removes the drill string for changing the bit. Thus, in the illustrated embodiment, when the wear of the segment reaches a preselected value, the insert causes the bearing to jam or freeze, thereby signaling the driller at the surface that the selected degree of wear has occurred and permitting drilling to be stopped prior to losing a cutter in the hole.

Figure 6:
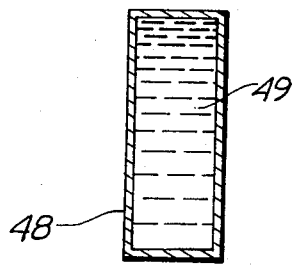
FIG. 6 illustrates in cross section an alternative insert for the segment of FIG. 5.

FIG. 6 illustrates an alternative insert to the hard insert 44 of FIG. 5. As illustrated in this embodiment, the insert comprises a cylindrical frangible plastic or glass envelope 48 which encapsulates a mobile liquid marker 49. The liquid marker may, for example, comprise a radioactive material or a conventional dye which may be visible or fluorescent, or, if desired, the marker liquid may be a radioactive dye. In some circumstances, a mobile pulverulent solid may be employed as a marker. In the embodiment illustrated in FIG. 6, when the frangible container 48 comes in contact with the bearing surfaces upon substantial wear of the segment in which it is inserted, the container is broken, and the mobile marker is released.

In the drilling of earth bores, a drilling fluid is customarily employed, being pumped down from the surface through the drill string into the region being cut, and then upwardly to the surface through the annular space between the drilled hole and the drill string. The drilling fluid may be air, water or more conventionally a so-called drilling mud, which is circulated for cooling the drill bit and removing pulverized rock from the drill hole. When the mobile marker material 49 from the insert in one of the segments is released, a quantity of this material soon reaches the drilling fluid and moves up the bore hole toward the surface. The driller at ground level senses the presence of the marker material in the returning fluid. In one embodiment he may note a dye visually in normal lighting if colored, or in ultraviolet light if fluorescent. Automatic sensing instruments for radioactive material can be employed at the surface for remotely sensing the presence of the marker material. If a radioactive dye is employed, visual observation of the returning fluid confirms the existence of the marker sensed by a radiation detector to minimize the possibility of false alarms. In this way, breaking of the frangible insert provides a signal that is readily sensible at the surface.

Although specific means have been described and illustrated for providing a remotely sensible signal of bearing wear in a segment bearing for a rock drill, modifications and variations within the scope of the invention will be apparent to one skilled in the art. Thus, for example, in the illustrated arrangement, a passage through the segment is employed for loosely accommodating the insert, and it will be apparent to one skilled in the art that a blind hole for the insert can be employed if desired so that the insert is adjacent but one of the bearing faces. If desired the insert can be tightly fixed in the hole, however, it is preferred that it be loose for ease of assembly and since the inserts can often be salvaged if loose and re-used.

WHAT IS CLAIMED IS:

1. A segment for a segment bearing comprising:
    a segment of bearing material having a first bearing face and a second bearing face in spaced relation to the first bearing face, the first and second bearing faces for engagement with adjacent bearing surfaces on a set of relatively movable members, and an aperture extending between the first and second bearing faces;
    an insert within the aperture for providing a remotely sensible signal indicative of bearing wear; and
    sufficient clearance between the insert and a bearing face on the segment to prevent substantial contact of the insert and an adjacent bearing surface when the segment is satisfactory for use and insufficient to prevent substantial contact when the segment is worn by an unacceptable extent.

2. A segment as defined in claim 1 wherein the insert comprises means for locking the otherwise relatively movable parts against relative movement upon contact of the insert with the load bearing surface of one of the movable parts.

3. A segment as defined in claim 2 wherein the insert comprises a cylinder of material substantially harder than the material of the segment.

4. A segment as defined in claim 1 wherein the insert comprises a frangible container and a mobile marker material in the frangible container.

5. A bearing as defined in claim 4 wherein the mobile marker comprises a dye.

6. A bearing as defined in claim 4 wherein the marker material comprises a radioactive substance.

7. In a segment bearing between relatively rotatable parts having load bearing surfaces, and a plurality of separate segments of bearing material between the load bearing surfaces, each of the segments having a first bearing surface and a second bearing surface, the improvement comprising:
   an insert in a segment for interacting with the load bearing surfaces of the relatively rotatable parts for producing a remotely sensible signal indicative of a selected degree of wear of the segment; and
   a clearance between an end of the insert and a bearing surface of the segment sufficient to prevent substantial contact of the insert with a load bearing surface of one of the rotatable parts when the segment is satisfactory for use and insufficient to prevent substantial contact of the insert and the load bearing surface of a rotatable part when the segment is worn by an unacceptable extent.

8. In an improved bearing as defined in claim 7 an insert that comprises means for locking the otherwise relatively rotatable parts against relative rotation upon contact of the insert with the load bearing surface of one of the rotatable parts.

9. In an improved bearing as defined in claim 8 an insert that comprises a cylinder of material substantially harder than the material of the segment and the material of the load bearing surface.

10. In an improved bearing as defined in claim 7 an insert that comprises a frangible container and a mobile marker material in the frangible container.

11. In an improved bearing as defined in claim 10 a mobile marker that comprises a dye.

12. In an improved bearing as defined in claim 10 a marker material that comprises a radioactive substance.

13. A method for detecting wear of a segment bearing in an earthboring drill during use in a bore hole comprising the steps of:
   inserting a signal producing means in a segment of the bearing;
   leaving a sufficient clearance between the signal producing means and a bearing surface of the segment for accommodating acceptable segment wear;
   producing a remotely sensible signal when the insert contacts a bearing surface adjacent the segment; and
   sensing the signal produced at a location remote from the bearing.

14. A method as defined in claim 13 wherein the step of producing a signal comprises locking the bearing for effecting a substantial change in torque of the earthboring drill.

15. A method as defined in claim 13 wherein the step of producing a signal comprises releasing a mobile marker into a drilling fluid when the insert contacts a bearing surface.

16. An earthboring drill bit assembly comprising:
   a journal having an annular bearing surface thereabout;
   a cutter having a bearing race concentric with the bearing surface of the journal;
   a bearing of unconnected and separately movable segments of bearing material lying about and between the journal bearing surface and the race, and having a first bearing face in engagement with the journal bearing surface, a second bearing face in engagement with the race, and an aperture extending between the first and second bearing faces;
   an insert within the aperture for providing a remotely sensible signal indicative of bearing wear; and
   a clearance between the insert and the bearing face on the segment sufficient to prevent substantial contact of the insert and an adjacent bearing surface or race when the segment is satisfactory for use and insufficient to prevent substantial contact when the segment is worn by an unacceptable extent.

17. A bearing as defined in claim 16 wherein the insert comprises means for locking the otherwise relatively rotatable parts against relative rotation upon contact of the insert with the load bearing surface of one of the rotatable parts.

18. A bearing as defined in claim 17 wherein the insert comprises a cylinder of material substantially harder than the material of the segment and the material of the load bearing surface.

19. A bearing as defined in claim 16 wherein the insert comprises a frangible container and a mobile marker material in the frangible container.

20. A bearing comprising:
   a bearing journal;
   a bearing race opposed to the bearing journal;
   a plurality of separate segments of bearing material between the bearing journal and the bearing race, each of the segments having a first bearing surface in contact with the bearing journal and a second bearing surface in contact with the bearing race;
   an insert in a segment for interacting with the bearing journal and bearing race for producing a remotely sensible signal indicative of a selected degree of wear of the segment; and
   a clearance between an end of the insert and a bearing surface of the segment sufficient to prevent substantial contact of the insert with the journal and the race when the segment is satisfactory for use and insufficient to prevent substantial contact when the segment is worn by an unacceptable extent.

* * * * *